(12) United States Patent
Wong et al.

(10) Patent No.: US 10,624,325 B2
(45) Date of Patent: Apr. 21, 2020

(54) SPINNING REEL

(71) Applicant: Shimano Components (Malaysia) SND. BHD., Pontian, Johor (MY)

(72) Inventors: Kee Chung Wong, Johor (MY); Yik Hui Chan, Johor (MY)

(73) Assignee: SHIMANO COMPONENTS (MALAYSIA) SDN. BHD., Johor (MY)

( * ) Notice: Subject to any disclaimer, the term of this patent is extended or adjusted under 35 U.S.C. 154(b) by 0 days.

(21) Appl. No.: 16/368,669

(22) Filed: Mar. 28, 2019

(65) Prior Publication Data

US 2019/0350182 A1 Nov. 21, 2019

(30) Foreign Application Priority Data

May 18, 2018 (JP) .................................. 2018-096653

(51) Int. Cl.
*A01K 89/01* (2006.01)
*A01K 89/015* (2006.01)

(52) U.S. Cl.
CPC ................................ *A01K 89/0176* (2015.05)

(58) Field of Classification Search
CPC ........ A01K 89/01082; A01K 89/01083; A01K 89/01084; A01K 89/01086
See application file for complete search history.

(56) References Cited

U.S. PATENT DOCUMENTS

| | | | | |
|---|---|---|---|---|
| 5,683,049 A | * | 11/1997 | Kawabe | A01K 89/01083 242/232 |
| 2001/0032901 A1 | * | 10/2001 | Sato | A01K 89/01083 242/232 |
| 2003/0116666 A1 | * | 6/2003 | Takikura | A01K 89/01083 242/232 |
| 2003/0146319 A1 | * | 8/2003 | Iwabuchi | A01K 89/01083 242/231 |
| 2009/0166458 A1 | * | 7/2009 | Murakami | A01K 89/0114 242/232 |
| 2010/0187345 A1 | * | 7/2010 | Hiraoka | A01K 89/0108 242/230 |
| 2015/0250156 A1 | * | 9/2015 | Hui | A01K 89/01082 242/234 |

FOREIGN PATENT DOCUMENTS

JP 2016-116463 A 6/2016

* cited by examiner

*Primary Examiner* — Emmanuel M Marcelo
(74) *Attorney, Agent, or Firm* — Global IP Counselors, LLP

(57) ABSTRACT

A spinning reel configured such that when a rotor rotates in a line-winding direction, the attitude of a bail arm is switched from a line-releasing attitude to a line-winding attitude. The spinning reel includes a reel body and a bail reversing mechanism. The bail reversing mechanism includes an engagement member and a switching member. The reel body has an accommodation recess for accommodating at least a portion of the switching member. The engagement member engages the bail arm. The switching member is disposed on the reel body. The switching member switches the attitude of the bail arm via the engagement member by contact with the engagement member.

5 Claims, 12 Drawing Sheets

SPINNING REEL

CROSS-REFERENCE TO RELATED APPLICATIONS

This application claims priority to Japanese Patent Application No. 2018-096653, filed on May 18, 2018. The entire disclosure of Japanese Patent Application No. 2018-096653 is hereby incorporated herein by reference.

BACKGROUND

Field of the Invention

The present invention relates to a spinning reel, in particular, to a spinning reel that is configured to be capable of switching the attitude of a bail arm from a line-releasing (casting) attitude to a line-winding attitude when a rotor rotates in a line-winding direction.

Background Art

A conventional spinning reel includes a bail arm, and a bail reversing mechanism that returns the bail arm from a line-releasing attitude to a line-winding attitude (for example, refer to Japanese Published Unexamined Application No. 2016-116463). The conventional bail reversing mechanism comprises an engagement member (moving member of Japanese Published Unexamined Application No. 2016-116463) and a switching member. The engagement member engages the bail arm. The switching member is disposed in the reel body. The switching member switches the attitude of the bail arm via the engagement member by contact with the engagement member.

In a conventional spinning reel, in order to smoothly switch the attitude of the bail arm, the switching member has a tapered shape. In this case, it is possible that portions where the plate thickness of the switching member is small, for example, the end portion of the switching member, may be affected by environmental changes (temperature change etc.) and deform.

SUMMARY

The present invention was made in light of the problem described above, and an object of the present invention is to provide a spinning reel that can prevent deformation of the switching member.

A spinning reel according to one aspect of the present invention is configured to be capable of switching the attitude of a bail arm from a line-releasing (casting) attitude to a line-winding attitude, when a rotor rotates in a line-winding direction.

The present spinning reel comprises a reel body and a bail reversing mechanism. The bail reversing mechanism has an engagement member and a switching member. The reel body has an accommodation recess for accommodating at least a portion of the switching member. The engagement member engages the bail arm. The switching member is disposed in the reel body. The bail reversing mechanism reverses (switches) the attitude of the bail arm via the engagement member by contact with the engagement member.

In the present spinning reel, the reel body has an accommodation recess. As a result, at least a portion of the switching member can be accommodated in the accommodation recess. That is, compared with the prior art, the rigidity of the switching member, for example, the thickness of the switching member, can be partially or entirely increased. Thus, deformation of the switching member can be prevented.

In the spinning reel according to another aspect of the present invention, the switching member preferably has a first end portion, a second end portion, and an intermediate portion. A portion of at least the one end portion is accommodated in the accommodation recess. At least a portion of the second end portion is thicker than the first end portion in an axial direction along an axis of rotation (described further below) of the rotor. The intermediate portion is disposed between the first end portion and the second end portion. The intermediate portion guides the engagement member in the axial direction by contact with the engagement member.

According to this configuration, since a portion of at least the first end portion is accommodated in the accommodation recess, the rigidity of the switching member (the first end portion, the second end portion, and the intermediate portion), for example, the thickness of the switching member, can be partially or entirely increased. It is thereby possible to suitably prevent deformation of the switching member.

In the spinning reel according to another aspect of the present invention, the distal end of at least the first end portion is preferably accommodated in the accommodation recess.

According to this configuration, since the distal end of at least the first end portion is accommodated in the accommodation recess, it is possible to prevent contact between the distal end of the switching member (distal end of the first end portion) and the engagement member. It is thereby possible to prevent deformation of the distal end of the switching member (distal end of the first end portion).

In the spinning reel according to another aspect of the present invention, the switching member preferably further has an attachment portion. The attachment portion is disposed on at least one of the first end portion, the second end portion, and the intermediate portion.

According to this configuration, since the switching member includes the attachment portion, it is possible to easily attach the switching member to the reel body in a state in which at least a portion of the switching member is accommodated in the accommodation recess.

One aspect of the present invention is configured to be capable of casting a fishing line in the forward direction. The present spinning reel comprises the reel body, a spool, a rotor, a bail arm, the engagement member, and the switching member. The reel body has an accommodation recess for accommodating at least a portion of the switching member.

The spool is disposed in the reel body. The fishing line is wound around the spool. The rotor is rotatable relative to the reel body in order to wind the fishing line around the spool.

The bail arm is pivotably disposed on the rotor so that the attitude of the bail arm can be changed between the line-winding attitude, in which the fishing line can be wound around the spool, and the line-releasing attitude, in which the fishing line can be unreeled from the spool for example, when casting.

The engagement member engages the bail arm. The engagement member is disposed on the rotor so as to be movable between a first position corresponding to the line-winding attitude and a second position corresponding to the line-releasing attitude, in conjunction with the pivoting of the bail arm.

The switching member switches the attitude of the bail arm by moving the engagement member from the second position to the first position when the engagement member is positioned at the second position and the rotor rotates in the line-winding direction.

In the present spinning reel, the reel body includes the accommodation recess. As a result, at least a portion of the switching member can be accommodated in the accommodation recess. That is, compared with the prior art, the rigidity of the switching member, for example, the thickness of the switching member, can be partially or entirely increased. It is thereby possible to prevent deformation of the switching member.

By the present invention, it is possible to prevent the deformation of the switching member of the spinning reel.

DETAILED DESCRIPTION OF THE EMBODIMENT

Figure 1:
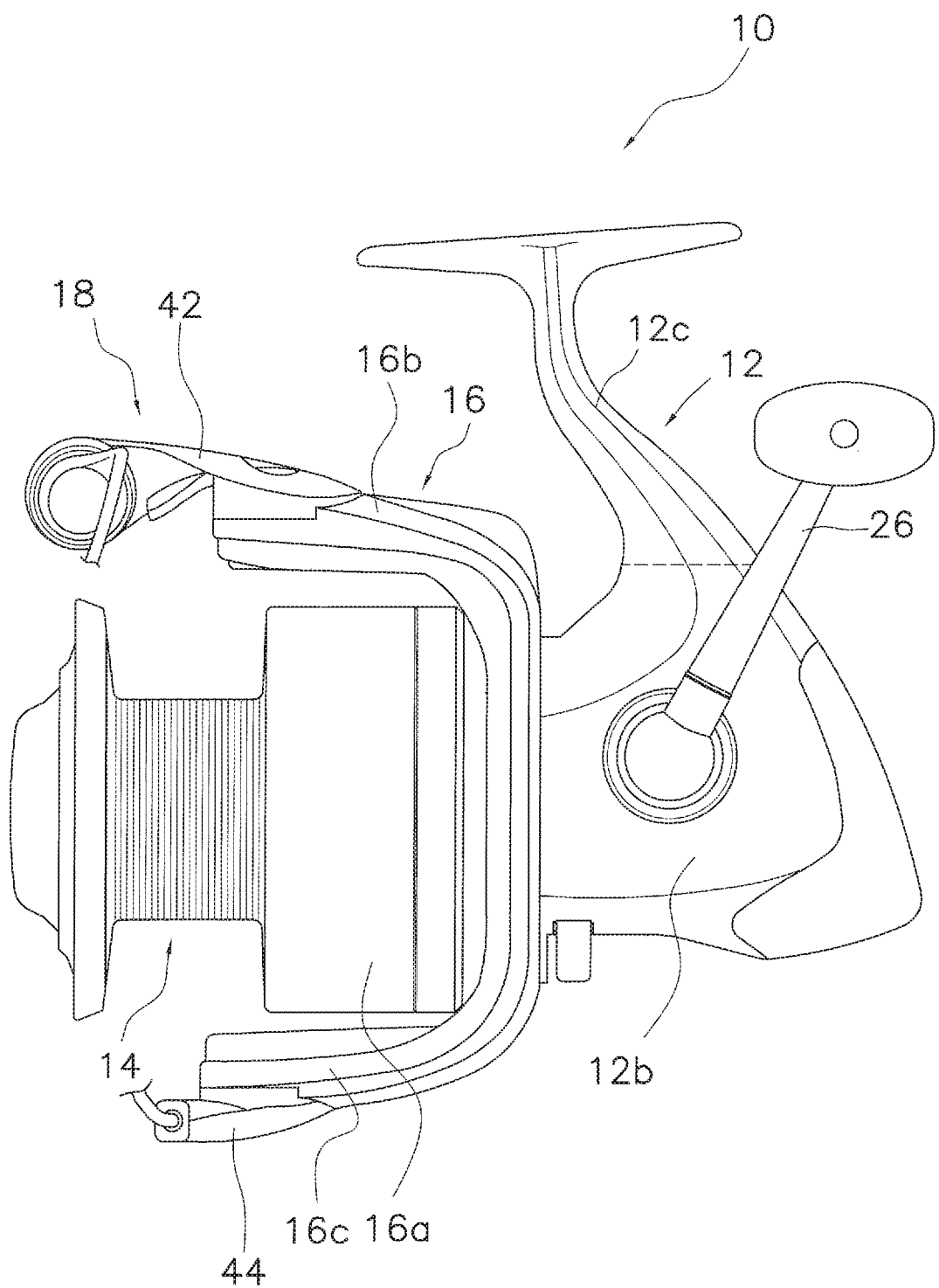
FIG. 1 is a side view of a spinning reel according to one embodiment of the present invention.

A spinning reel 10 employing one embodiment of the present invention is a reel that can cast (unreel) a fishing line in a forward direction. As shown in FIG. 1, the spinning reel 10 comprises a reel body 12, a spool 14, a rotor 16, a bail arm 18, and a bail reversing mechanism 20 (refer to FIG. 2).

In the following description, "front" corresponds to a direction in which the fishing line is cast in a state in which the spinning reel 10 is attached to a fishing rod. "Back" corresponds to the direction opposite to "front."

Reel Body

Figure 2:
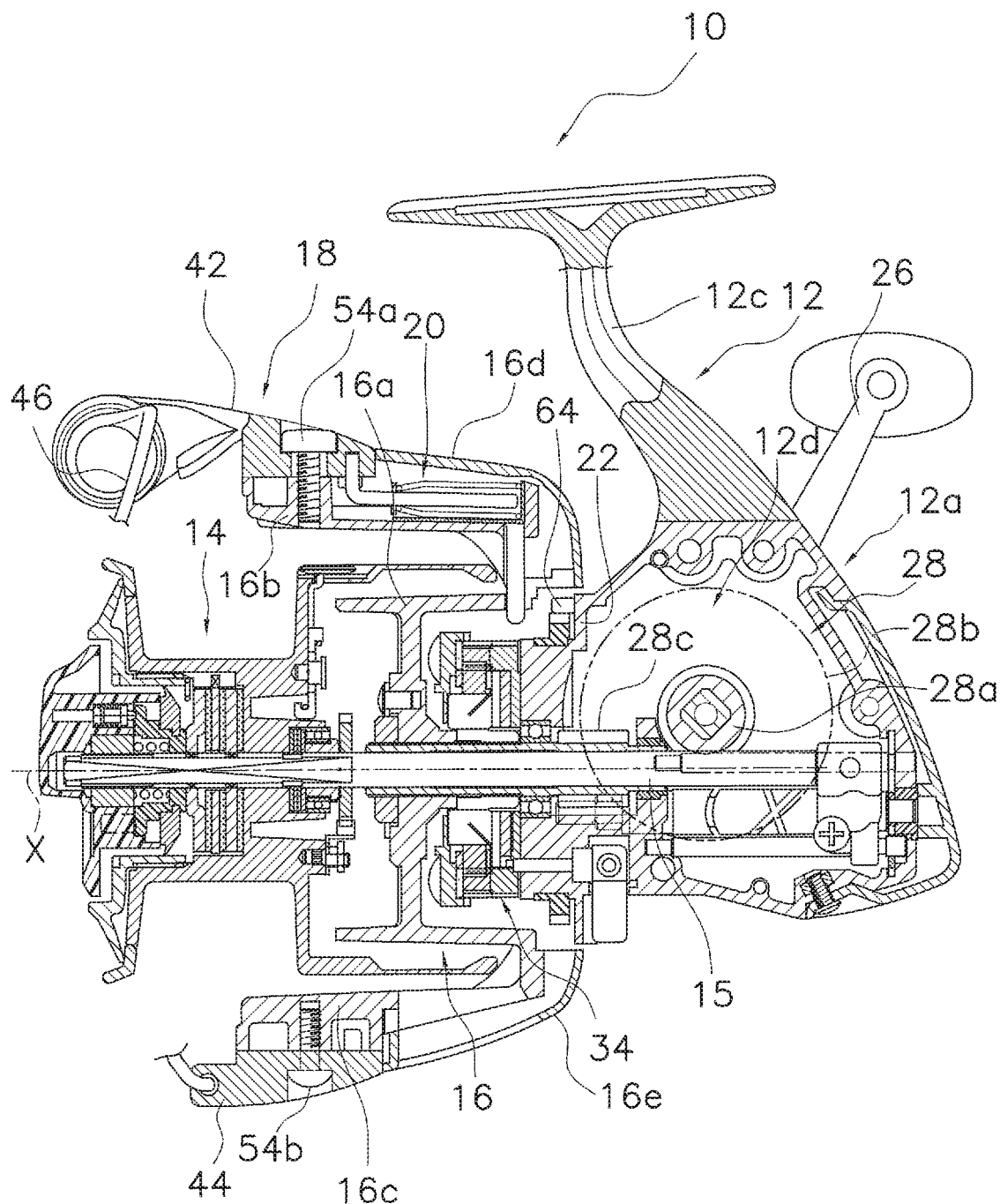
FIG. 2 is a side cross-sectional view of the spinning reel.
Figure 3:
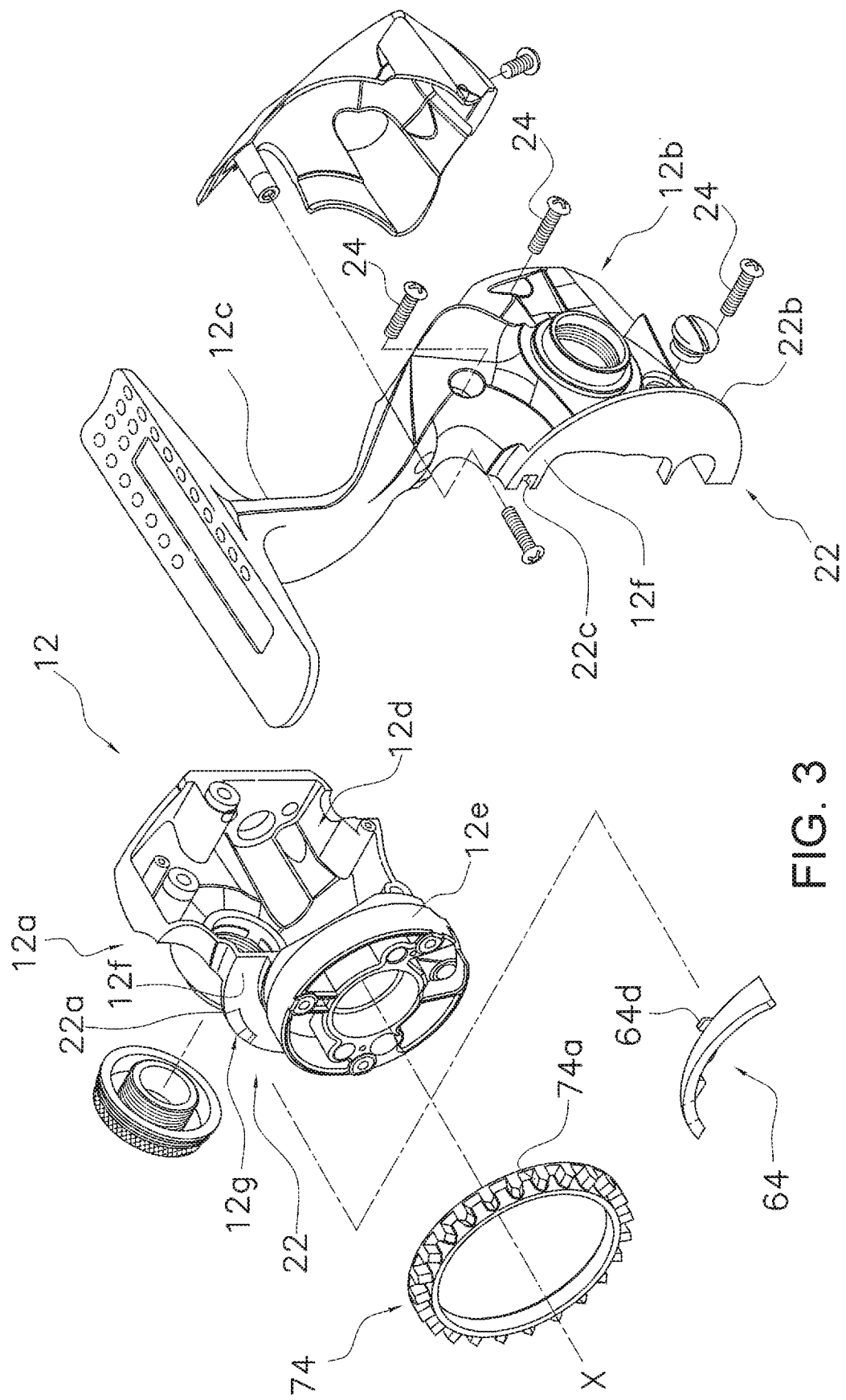
FIG. 3 is an exploded perspective view of a reel body of the spinning reel.

As shown in FIGS. 2 and 3, the reel body 12 comprises a housing 12a, a lid member 12b (refer to FIG. 1), and a rod attachment leg portion 12c. The housing 12a has a mechanism housing space 12d and a first flange portion 22a. The first flange portion 22a is disposed in front of the mechanism housing space 12d.

As shown in FIG. 3, the first flange portion 22a is formed in an essentially semicircular shape. The first flange portion 22a is disposed essentially parallel to a plane H (refer to FIGS. 8A and 8B) that is orthogonal to an axis of rotation X of the rotor 16. A tubular portion 12e having a smaller diameter than the first flange portion 22a is formed in a front portion of the first flange portion 22a projecting forward. The tubular portion 12e is formed in a tubular shape around the axis of rotation X of the rotor 16. The tubular portion 12e is provided concentrically with the first flange portion 22a.

A braking member (brake) 74 is mounted on the tubular portion 12e. The braking member 74 brakes the rotation of the rotor 16 when the bail arm 18 is positioned in the line-releasing attitude. For example, the braking member 74 has a plurality of engagement portions 74a that respectively engage an engagement member 60 (described further below). When the rotor 16 rotates in a state in which the engagement member 60 is engaged with the braking member 74 and the rotor 16, the braking member 74 slides on the tubular portion 12e and brakes the rotor 16.

The lid member 12b is fixed to the housing 12a so as to cover the mechanism housing space 12d. The lid member 12b is detachably fixed to the housing 12a by multiple fixing bolts 24. The lid member 12b has a semicircular second flange portion 22b. The first flange portion 22a and the second flange portion 22b constitute a circular flange portion 22. The flange portion 22 (first flange portion 22a and second flange portion 22b) supports a switching member (switch) 64 (described further below).

The rod attachment leg portion 12c is configured to be attachable to a fishing rod. The rod attachment leg portion 12c is disposed on either the housing 12a or the lid member 12b. As shown in FIG. 3, in the present embodiment, the rod attachment leg portion 12c is integrally disposed on the lid member 12b. The rod attachment leg portion 12c may be integrally disposed on the housing 12a.

Here, as shown in FIGS. 1 and 2, a handle 26 is mounted on the reel body 12 so as to be freely rotatable. The handle 26 is mounted on either the housing 12a or the lid member 12b. FIG. 1 shows an example in which the handle 26 is mounted on the lid member 12b (left handle). FIG. 2 shows an example in which the handle 26 is mounted on the housing 12a (right handle).

As shown in FIG. 3, the reel body 12 described above further has an accommodation recess 12g. More specifically, the reel body 12 further has a supporting surface 12f and the accommodation recess 12g.

The supporting surface 12f supports the switching member 64. The supporting surface 12f is disposed on a front portion of the reel body 12, on the plane H (refer to FIGS. 8A and 8B) that is orthogonal to the axis of rotation X. The supporting surface 12f may be interpreted as being disposed on the front portion of the reel body 12 so as to be parallel to the plane H that is orthogonal to the axis of rotation X.

Specifically, the supporting surface 12f is formed on the flange portion 22, for example, the first flange portion 22a and the second flange portion 22b. The supporting surface 12f is formed on the spool 14 side of the first flange portion 22a and the second flange portion 22b in an axial direction along the axis of rotation X.

Figure 6:
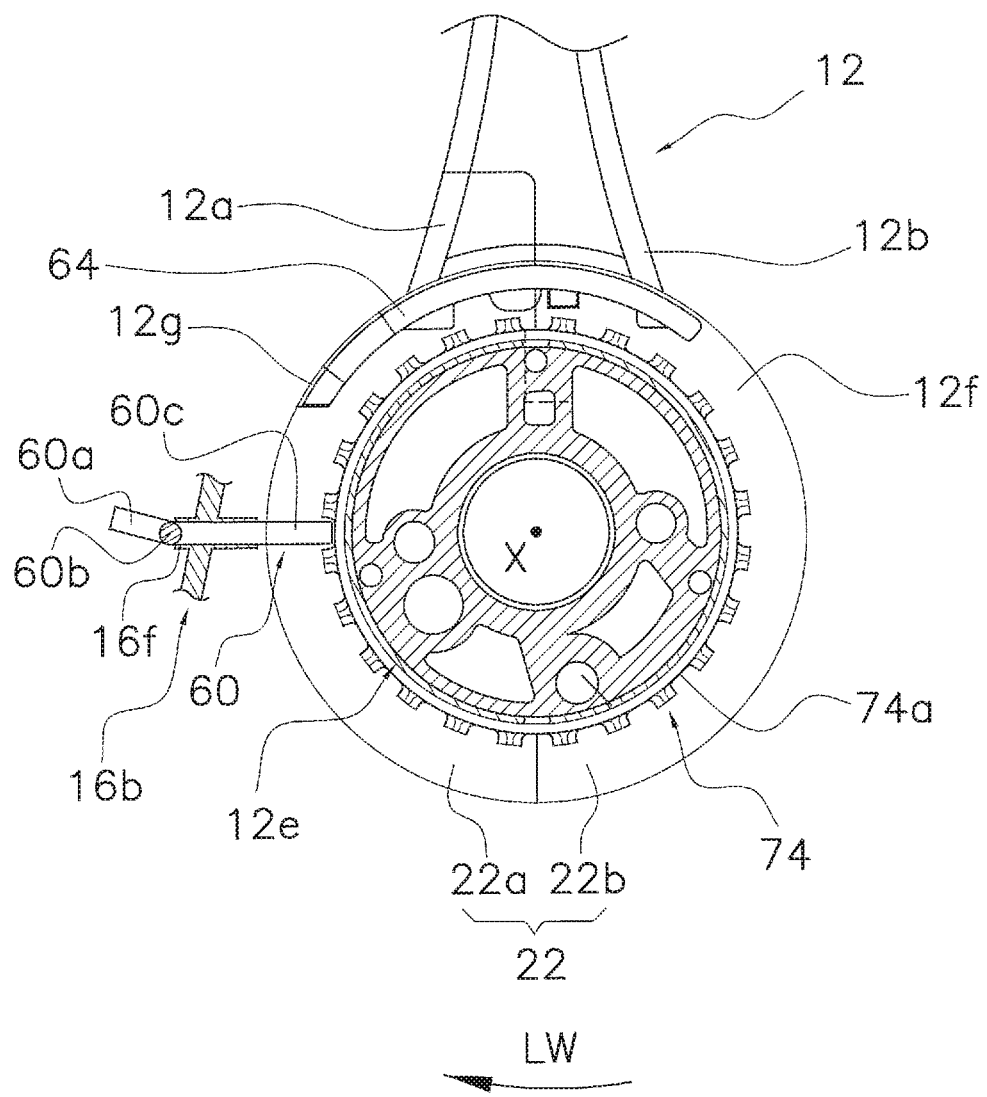
FIG. 6 is a front view of the reel body.
Figure 7:
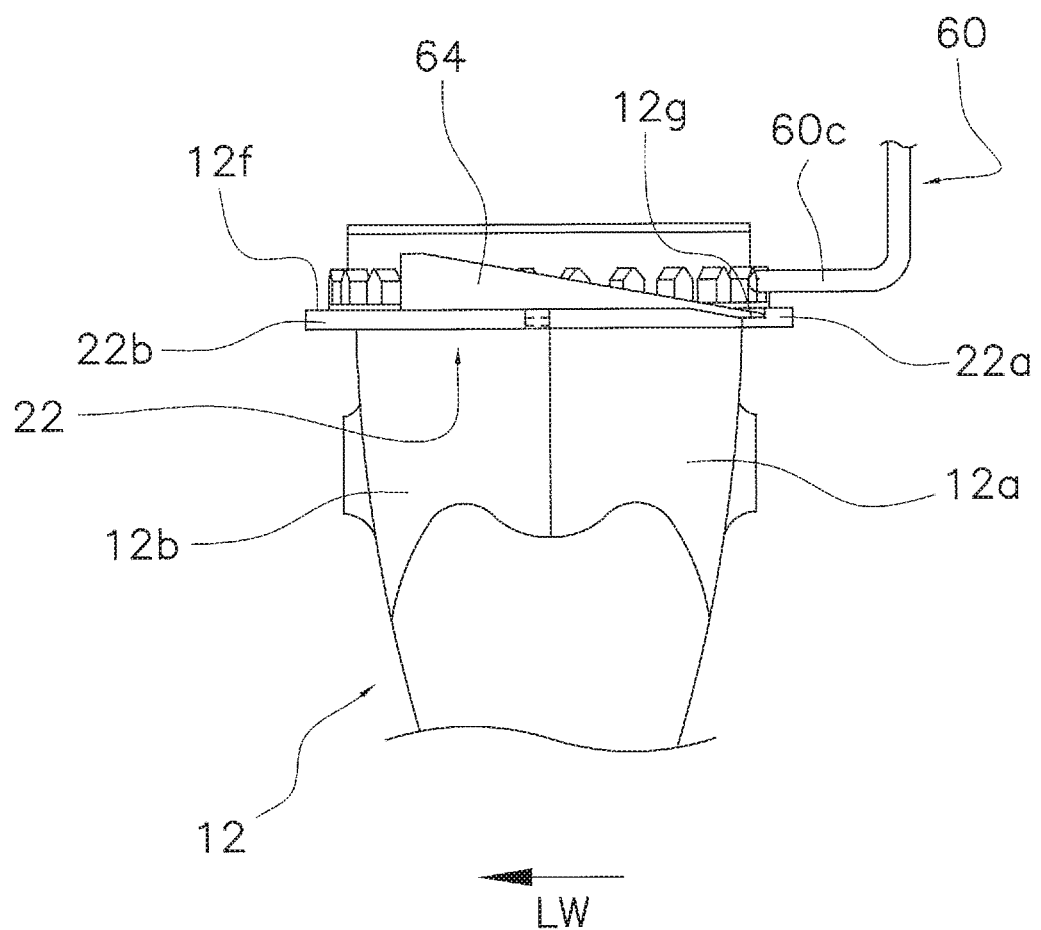
FIG. 7 is a top view of the reel body.

As shown in FIGS. 3, 6, and 7, the accommodation recess 12g accommodates at least a portion of the switching member 64. In the present embodiment, the accommodation recess 12g accommodates a portion of the switching member 64.

As shown in FIG. 3, the accommodation recess 12g is formed on the front portion of the reel body 12. Specifically, the accommodation recess 12g is formed on the supporting surface 12f on the flange portion 22 (first flange portion 22a and second flange portion 22b). The accommodation recess 12g is formed with a concave shape on the supporting surface 12f.

Figure 8A:
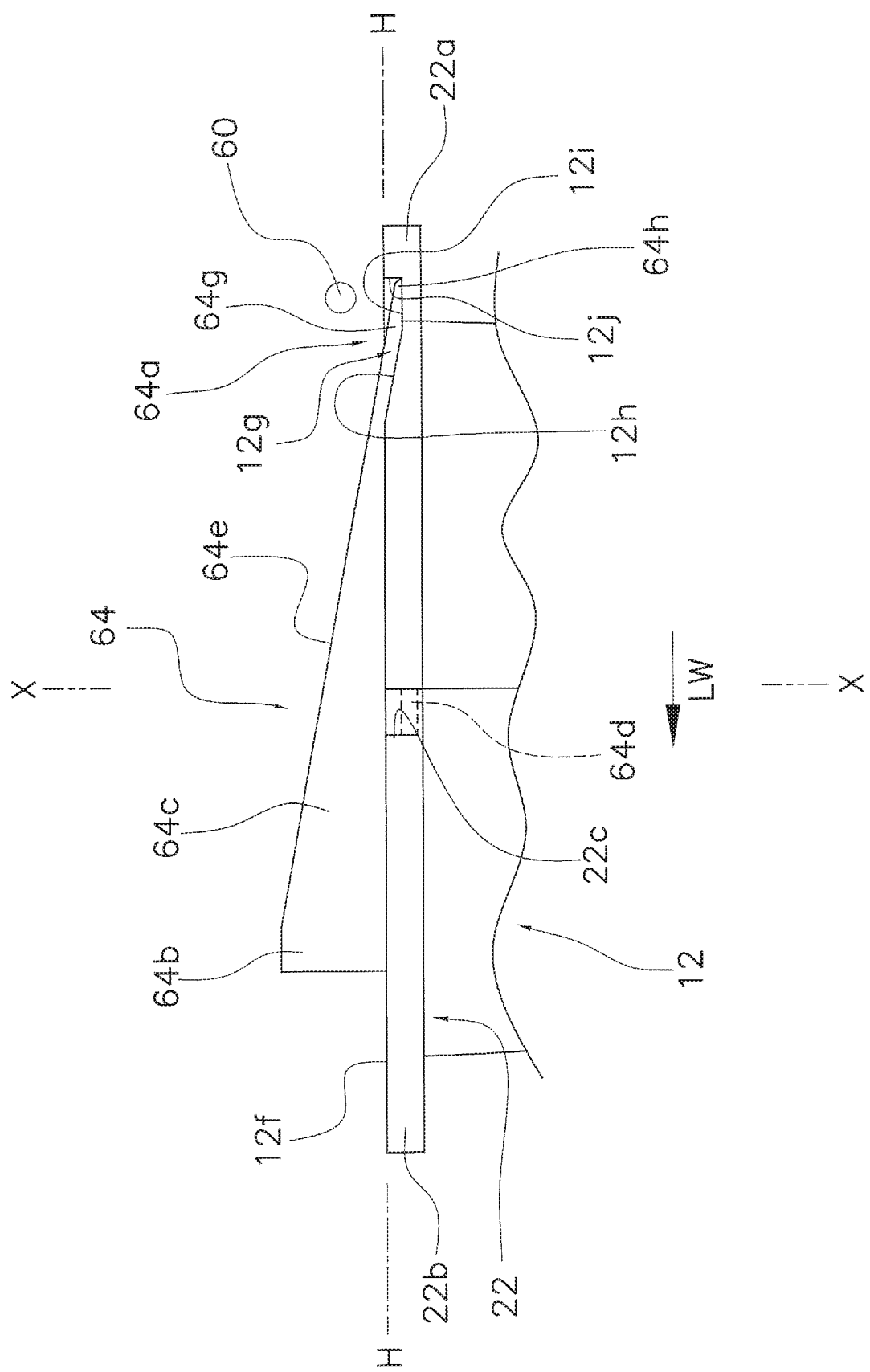
FIG. 8A is a top view of a partially enlarged switching member.

As shown in FIG. 8A, a side surface 12h of the accommodation recess 12g on a downstream side of the line-winding direction LW is inclined from a bottom portion 12i toward the supporting surface 12f of the accommodation recess 12g. A side surface 12j of the accommodation recess 12g on an upstream side in the line-winding direction LW extends from the bottom portion 12i of the housing recess 12g toward the axial direction along the axis of rotation X.

Spool

The fishing line is wound around the spool 14. As shown in FIG. 2, the spool shaft 14 is disposed on the reel body 12. For example, the spool 14 is provided on the reel body 12 so as to be capable of moving back and forth with respect to the reel body 12. More specifically, a spool shaft 15 has a spool axis that is coaxial with the axis of rotation X of the rotor 16. The spool 14 is disposed on the reel body 12 via the spool shaft 15. The spool shaft 15 is provided on the reel body 12 so as to be capable of moving back and forth with respect to the reel body 12 in an axial direction along the spool axis X.

Rotor

The rotor 16 is disposed so as to be rotatable relative to the reel body 12 in order to wind the fishing line around the spool 14. As shown in FIG. 2, the rotor 16 rotates in the line-winding direction LW (refer to FIGS. 4A to 4C) via a rotor drive mechanism 28. The rotor drive mechanism 28 comprises a drive shaft 28a that rotates in conjunction with the rotation of the handle 26, a drive gear 28b disposed on the drive shaft 28a, and a pinion gear 28c that meshes with the drive gear 28b.

For example, the rotor 16 has the axis of rotation X that is coaxial with the spool axis. The rotor 16 is disposed on the reel body 12 so as to be rotatable relative to the reel body 12 around the axis of rotation X.

The rotor 16 has a tubular connecting portion 16a that is connected to the pinion gear 28c so as to be integrally rotatable and a first rotor arm 16b and a second rotor arm 16c that are integrally formed with the connecting portion 16a.

The rotor 16 further comprises a first cover member 16d that covers the radially outer surface of the first rotor arm 16b and a second cover member 16e that covers the radially outer surface of the second rotor arm 16c.

The first rotor arm 16b extends forward from a rear-end portion of the connecting portion 16a, and is separate from the connecting portion 16a. The second rotor arm 16c extends forward from a rear-end portion of the connecting portion 16a that opposes the first rotor arm 16b, and is separate from the connecting portion 16a.

The rotation of the rotor 16 in the line-releasing direction (reverse rotation) is prohibited by an anti-reverse rotation mechanism 34 disposed between the reel body 12 and the rotor 16. In the present embodiment, the anti-reverse rotation mechanism 34 can be switched between a reverse rotation prohibition state for prohibiting the rotation in the line-releasing direction and a reverse rotation permission state for allowing the rotation in the line-winding direction LW (reverse rotation).

Bail Arm

The bail arm 18 is disposed on the rotor 16 so as to be pivotable. For example, as shown in FIG. 2, the bail arm 18 is mounted on a distal end portion of the first rotor arm 16b and the second rotor arm 16c that extends forward. In this state, the attitude of the bail arm 18 can be changed between the line-winding attitude in which the fishing line can be wound around the spool 14 and the line-releasing attitude in which the fishing line can be unreeled from the spool 14 or cast.

The bail arm 18 comprises a first bail support member 42, a second bail support member 44, and a bail 46 that connects the first bail support member 42 and the second bail support member 44.

The first bail support member 42 is mounted on an outer peripheral side of the distal end portion of the first rotor arm 16b so as to be pivotable with respect to the first rotor arm 16b. More specifically, the first bail support member 42 is pivotably attached to the first rotor arm 16b by a first attachment pin 54a that is screwed into the distal end of the first rotor arm 16b.

Figure 4A:
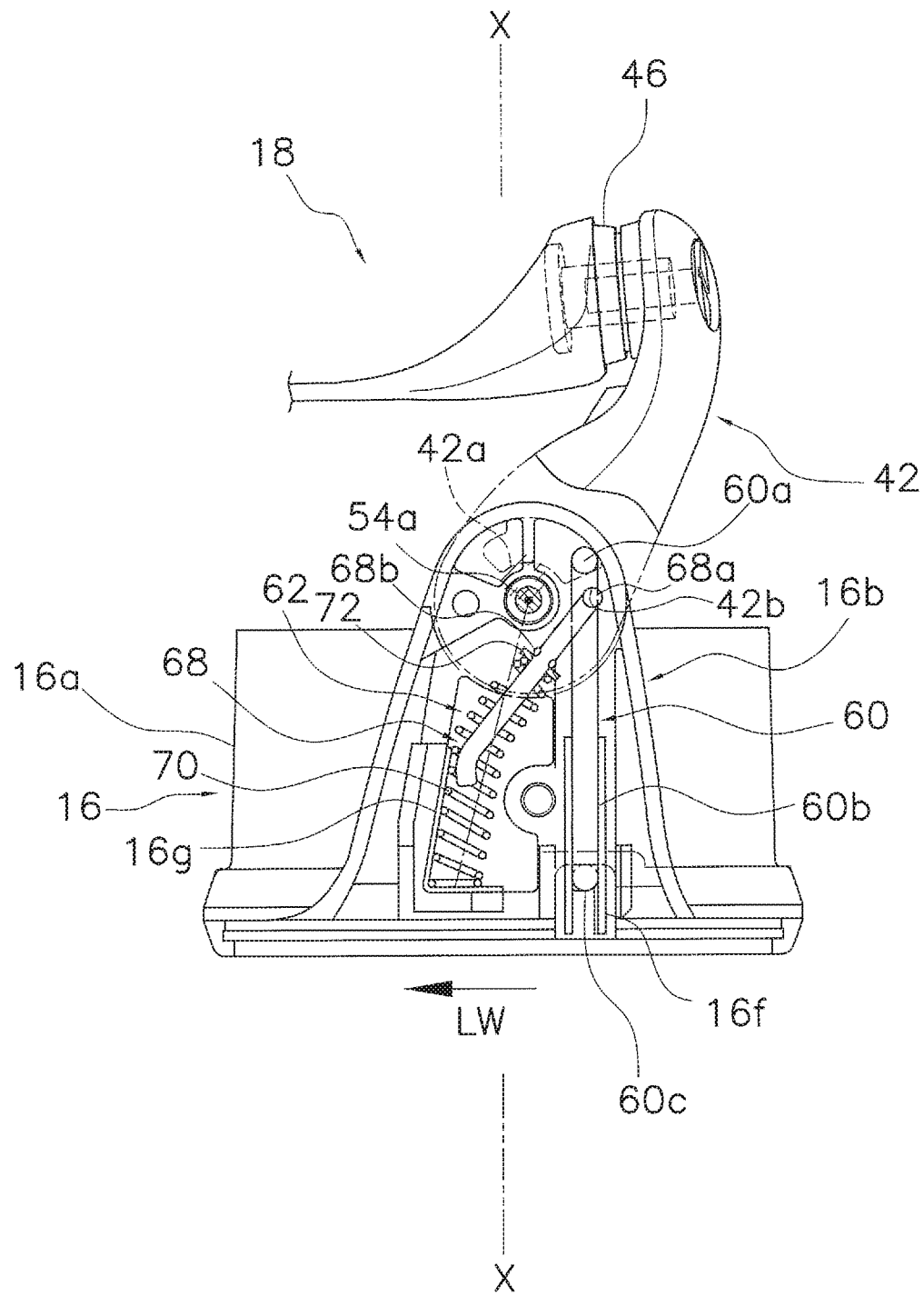
FIG. 4A is a side view of a first rotor arm that includes a bail arm in a line-winding attitude.
Figure 5:
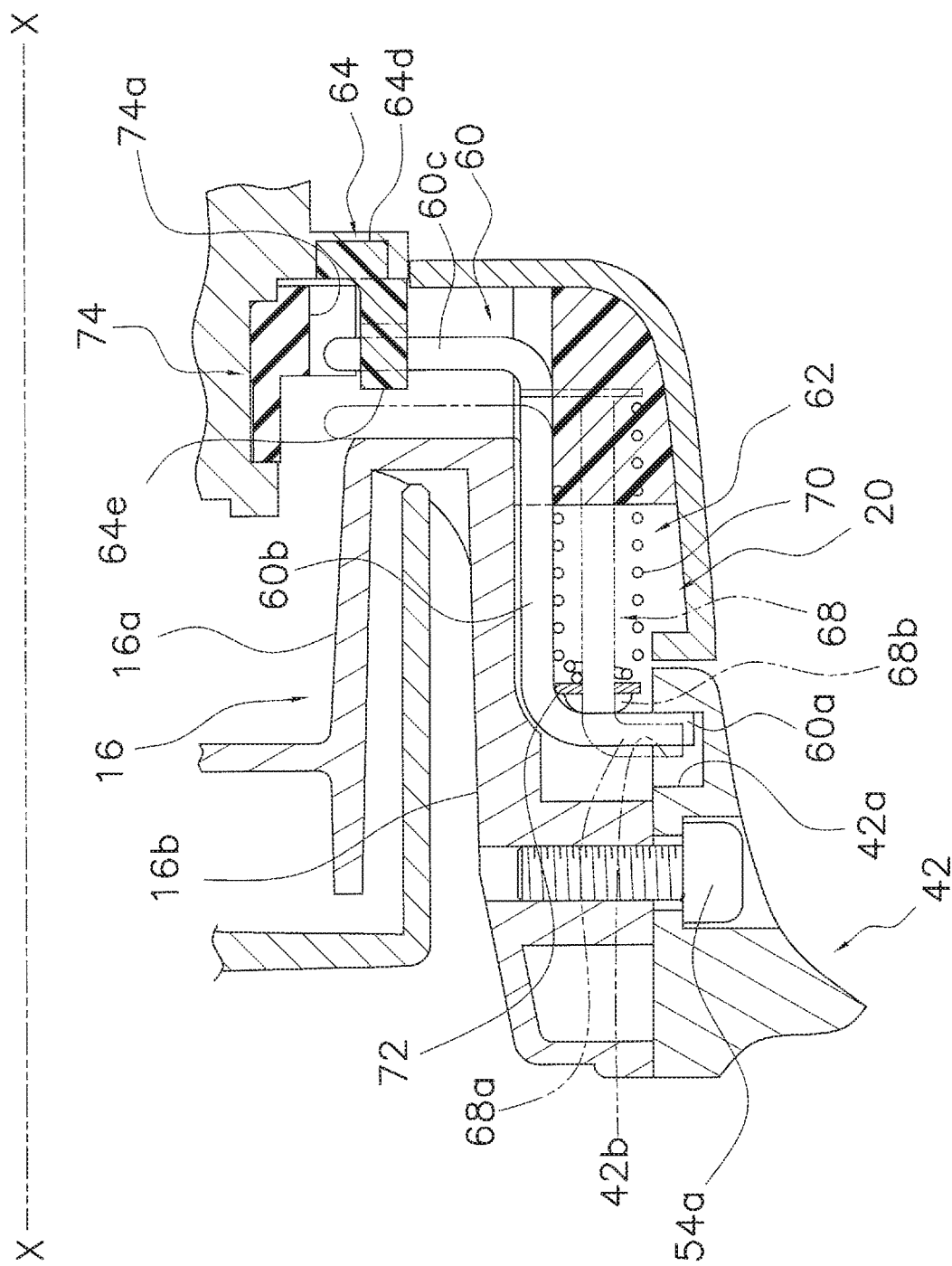
FIG. 5 is a partially enlarged cross-sectional view of the first rotor arm.

As shown in FIGS. 4A and 5, the first bail support member 42 has an engagement groove 42a and an engagement hole 42b. The engagement groove 42a is formed on a portion of the first bail support member 42 opposing the first rotor arm 16b, such as on a surface of the first bail support member 42 opposing the first rotor arm 16b. The engagement groove 42a is formed in an essentially fan-like shape. As shown in FIG. 4A, the engagement hole 42b is a hole portion with which a rod 68 engages. A distal end portion of the rod 68, such as an engagement portion 68a, engages the engagement hole 42b.

As shown in FIG. 3, the second bail support member 44 is mounted on an outer peripheral side of the distal end portion of the second rotor arm 16c so as to be pivotable with respect to the second rotor arm 16c. More specifically, the second bail support member 44 is pivotably attached to the second rotor arm 16c by a second attachment pin 54b that is screwed into the distal end of the second rotor arm 16c.

Bail Reversing Mechanism

The bail reversing mechanism 20 switches the bail arm 18 from the line-releasing attitude to the line-winding attitude in conjunction with the rotation of the rotor 16. For example, when the rotor 16 rotates in the line-winding direction LW (refer to FIGS. 4A to 4C), the bail reversing mechanism 20 switches the attitude of the bail arm 18 from the line-releasing attitude to the line-winding attitude. In addition, the bail reversing mechanism 20 maintains each of the line-releasing attitude and the line-winding attitude.

As shown in FIG. 2, the bail reversing mechanism 20 is disposed inside the first rotor arm 16b. The bail reversing mechanism 20 comprises the engagement member 60 and the switching member 64. More specifically, the bail reversing mechanism 20 comprises the engagement member 60, a toggle spring member 62, and the switching member 64.

Engagement Member

Figure 4B:
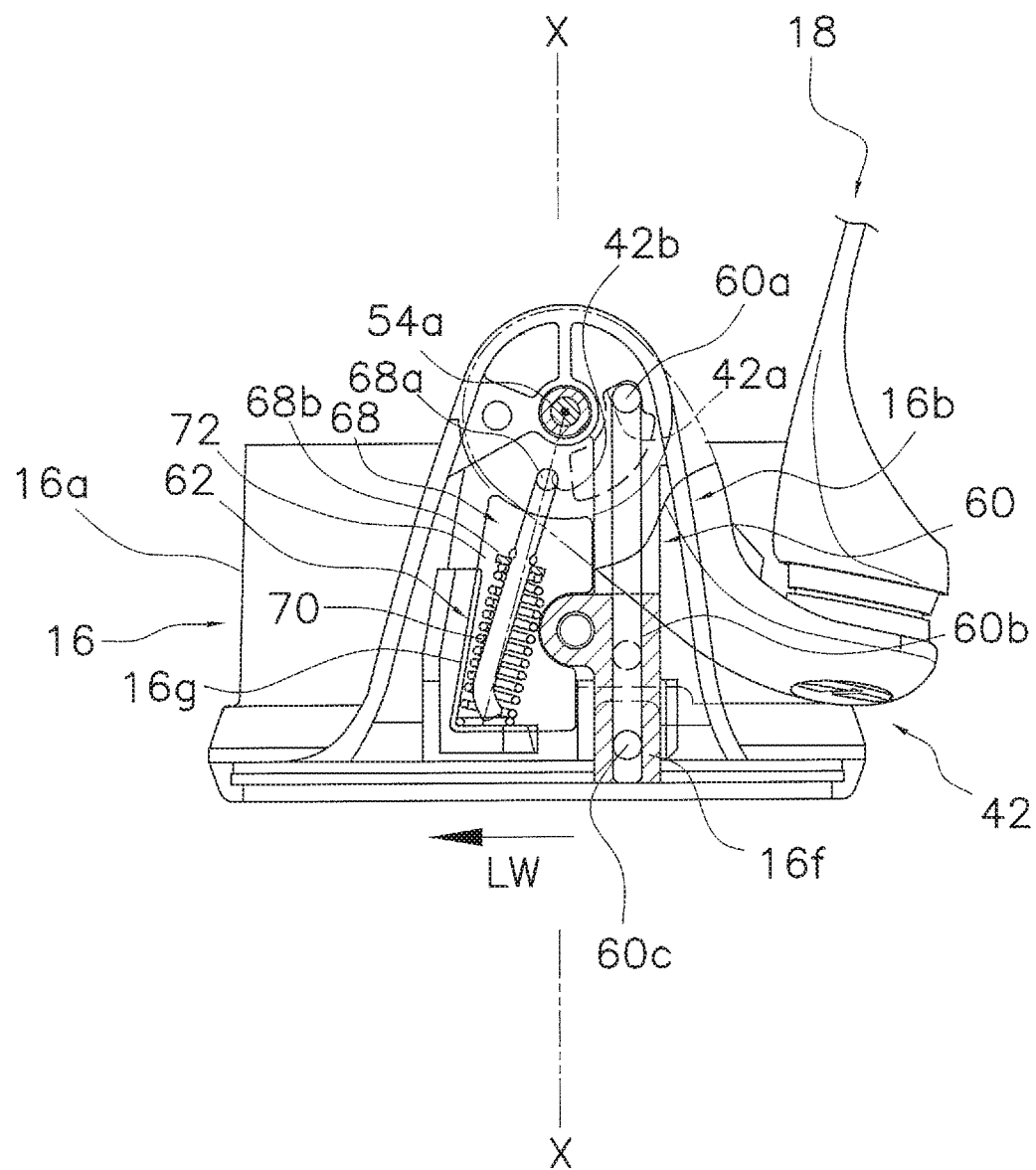
FIG. 4B is a side view of the first rotor arm including a bail arm in the line-releasing attitude.
Figure 4C:
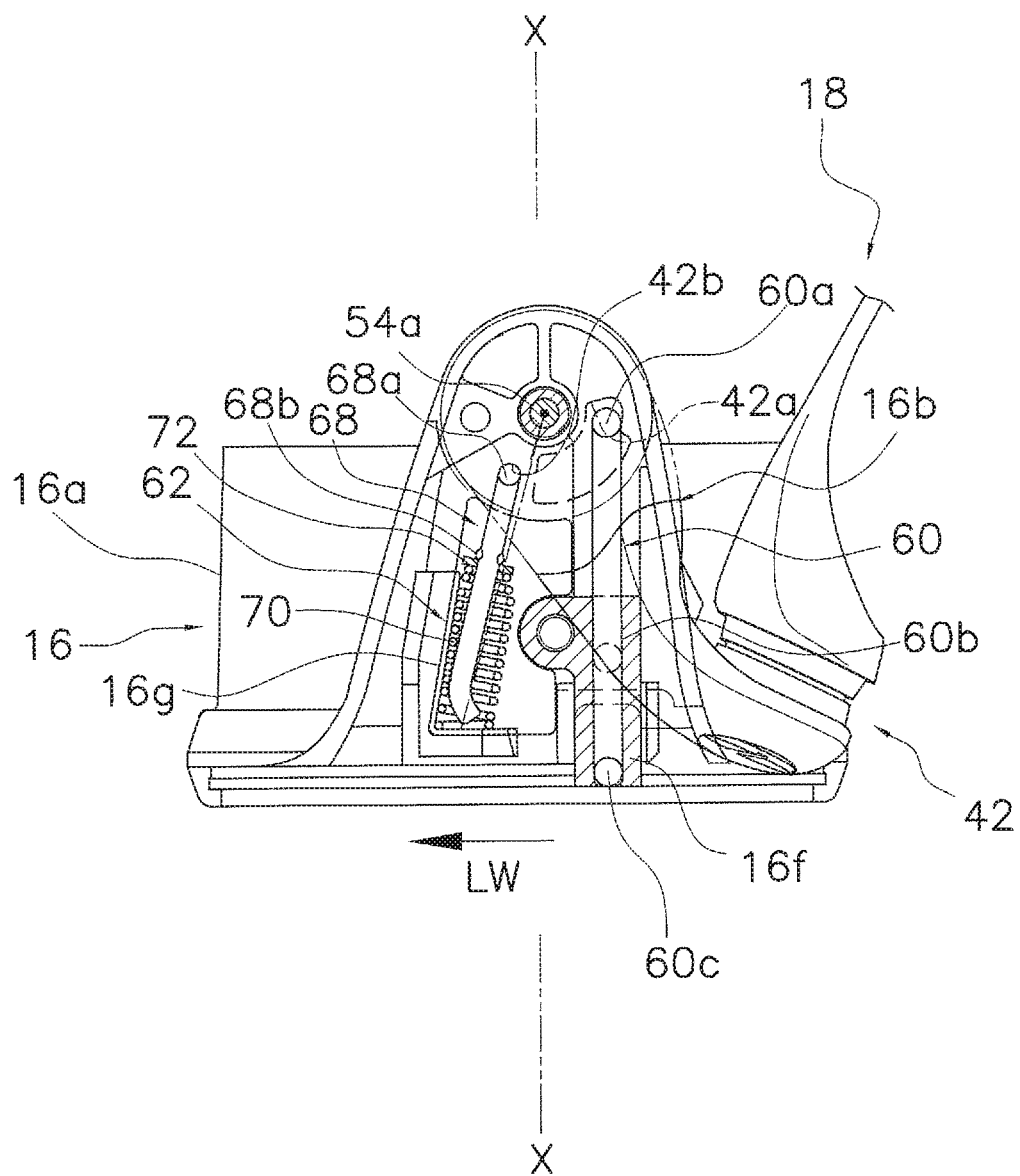
FIG. 4C is a side view of the first rotor arm when a toggle spring member is at a dead point.

As shown in FIGS. 4A and 4C, the engagement member 60 is disposed on the rotor 16 so as to be movable between a first position corresponding to the line-winding attitude (refer to FIG. 4A) and a second position corresponding to the line-releasing attitude (refer to FIG. 4C), in conjunction with the swinging of the bail arm 18. As shown in FIGS. 4A-4C, the engagement member 60 is freely movable relative to the first rotor arm 16b in the axial direction along the axis of rotation X.

The engagement member 60 is a metallic linear member. As shown in FIG. 5, two end portions of the engagement member 60 are bent in different directions. The engagement member 60 engages the bail arm 18, for example, with the first bail support member 42.

The engagement member 60 has a distal end portion 60a, and intermediate portion 60b and a rear-end portion 60c. The distal end portion 60a is a part of the engagement member 60 that is bent radially outward. As shown in FIGS. 4A and 5, the distal end portion 60a engages with the engagement groove 42a of the first bail support member 42.

As shown in FIG. 5, the intermediate portion 60b is a part of the engagement member 60 that is disposed between the distal end portion 60a and the rear-end portion 60c. The intermediate portion 60b is guided in the axial direction along the axis of rotation X in conjunction with the pivoting of the bail arm 18.

The intermediate portion 60b extends in the axial direction along the axis of rotation X on the radially inner side of the toggle spring member 62. The intermediate portion 60b is disposed on a guide portion 16f that is disposed on the first rotor arm 16b (refer to FIG. 4A).

As shown in FIG. 5, the rear-end portion 60c is a part that is bent radially inward. The rear-end portion 60c extends toward the axis of rotation X of the rotor 16. When the engagement member 60 is positioned at the second position, for example, when the engagement member 60 is positioned at the position of the solid line in FIG. 5, the rear-end portion 60c can come into contact with the switching member 64.

In addition, when the engagement member 60 is positioned at the position of the solid line of FIG. 5, the rear-end portion 60c can engage an engagement portion 74a of the engagement member 60. The intermediate portion 60b and the rear-end portion 60c are guided in the axial direction and the radial direction by the guide portion 16f mounted on the first rotor arm 16b (refer to FIG. 4A).

Toggle Spring Member

The toggle spring member 62 biases the bail arm 18 into either the line-winding attitude or the line-releasing attitude, which flank a dead point. In addition, the toggle spring member 62 holds the bail arm 18 in the line-winding attitude and the line-releasing attitude.

As shown in FIGS. 4A-4C and 5, the toggle spring member 62 comprises a rod 68 and a coil spring 70. One end of the rod 68 is locked to the first bail support member 42. The other end of the rod 68 extends along the first rotor arm 16b.

The rod 68 has a locking portion 68a and a locking projection 68b. The locking portion 68a is a part that is bent toward the first bail support member 42. The distal end of the locking portion 68a engages the engagement hole 42b of the first bail support member 42.

As shown in FIG. 5, the locking projection 68b locks an end portion of the coil spring 70. For example, a washer 72 is mounted on the locking projection 68b. The distal end portion of the coil spring 70 abuts the washer 72. As a result, force is evenly transmitted to the rod 68 from the distal end portion of the coil spring 70.

As shown in FIGS. 4A-4C, the coil spring 70 biases the rod 68. Movement of the coil spring 70 in the line-winding direction LW is restricted by a restriction wall 16g provided on the outer side surface of the first rotor arm 16b. The coil spring 70 contracts the most at the dead point shown in FIG. 4B.

Switching Member

The switching member 64 is provided on the reel body 12. The switching member 64 switches the attitude of the bail arm 18 via the engagement member 60 by contact with the engagement member 60.

The switching member 64 guides the engagement member 60 from the second position to the first position (position in FIG. 4A) when the engagement member 60 is positioned in the second position (position in FIG. 4C) and the rotor 16 rotates in the line-winding direction LW. The attitude of the bail arm 18 is thereby switched.

As shown in FIGS. 6 and 7, at least a portion of the switching member 64 is accommodated in the accommodation recess 12g. In the present embodiment, a portion of the switching member 64 is accommodated in the accommodation recess 12g. For example, as shown in FIG. 6, when the switching member 64 is viewed in the axial direction along the axis of rotation X of the rotor 16, the switching member 64 is formed in an essentially arcuate shape. As shown in FIG. 7, one part of the switching member 64 is disposed in the accommodation recess 12g and the other part of the switching member 64 is disposed in the supporting surface 12f.

As shown in FIG. 8A, the switching member 64 has a first end portion 64a, a second end portion 64b, and an intermediate portion 64c. The switching member 64 further has an attachment portion 64d. The switching member 64 further has an inclined surface 64e.

The first end portion 64a is disposed on the upstream side of the rotor 16 in the line-winding direction LW. A portion of at least the one end portion 64a is accommodated in the accommodation recess 12g. A distal end 64h of at least the first end portion 64a is housed in the accommodation recess 12g.

In the present embodiment, a portion of the switching member 64 disposed in the area where the accommodation recess 12g is formed in the circumferential direction around the axis of rotation X, in a state in which the switching member 64 is attached to the reel body 12, is defined as the first end portion 64a.

In this embodiment, the first end portion 64a is partially accommodated in the accommodation recess 12g. That is, a portion 64g of the first end portion 64a is accommodated in the accommodation recess 12g. The distal end 64h of the first end portion 64a is accommodated in the accommodation recess 12g. The distal end 64h of the first end portion 64a is not in contact with the engagement member 60.

As shown in FIG. 8A, the second end portion 64b is disposed further on the downstream side of the rotor 16 in the line-winding direction LW than the first end portion 64a. The second end portion 64b is disposed on the supporting surface 12f. The second end portion 64b is the end portion on the opposite side of the first end portion 64a in the circumferential direction around the axis of rotation X.

In the present embodiment, a portion where the inclined surface 64e is not formed in a state in which the switching member 64 is attached to the reel body 12 is defined as the second end portion 64b. In this embodiment, at least a portion of the second end portion 64b is thicker than the first end portion 64a in the axial direction along the axis of rotation X. More specifically, the second end portion 64b is thicker than the first end portion 64a in the axial direction along the axis of rotation X.

As in the prior art described above, the second end portion 64b may be formed such that the end surface of the second end portion 64b is thinner than the central portion of the second end portion 64b in the circumferential direction. In this embodiment, a portion of the second end portion 64b is thicker than the first end portion 64a in the axial direction along the axis of rotation X.

As shown in FIG. 8A, the intermediate portion 64c is disposed between the first end portion 64a and the second end portion 64b. The intermediate portion 64c is disposed on the supporting surface 12f. The intermediate portion 64c guides the engagement member 60 in the axial direction along the axis of rotation X by contact with the engagement member 60. More specifically, the inclined surface 64e disposed in the intermediate portion 64c guides the engagement member 60 in the axial direction along the axis of rotation X.

As shown in FIG. 8A, the attachment portion 64d is disposed in at least one of the first end portion 64a, the second end portion 64b, and the intermediate portion 64c. In the present embodiment, the attachment portion 64d is integrally formed with the intermediate portion 64c. The attachment portion 64d engages a recess 22c that is disposed in the second flange portion 22b.

As a result, the attachment portion 64d is clamped between the first flange portion 22a and the second flange portion 22b while in a state of retention in the recess 22c. By configuring the attachment portion 64d in this manner, it is possible to attach the switching member 64 to the reel body 12 without using a member for fixing the switching member 64.

As shown in FIG. 8A, the inclined surface 64e is provided in order to guide the engagement member 60 in the axial direction along the axis of rotation X by contact with the engagement member 60. The inclined surface 64e is disposed on the switching member 64 on the opposite side of the supporting surface 12f in the axial direction along the axis of rotation X, that is, on the spool 14 side. In the present embodiment, the inclined surface 64e is disposed on the first end portion 64a and the intermediate portion 64c on the spool 14 side described above.

In a state in which the switching member 64 is attached to the reel body 12, the inclined surface 64e is inclined with respect to the plane H that is orthogonal to the axis of rotation X. In addition, the inclined surface 64e is inclined forward along the circumferential direction described above (line-winding direction LW) from the first end portion 64a to the second end portion 64b.

As described in relation to the intermediate portion 64c above, the inclined surface 64e of the intermediate portion 64c comes into contact with the engagement member 60 and guides the engagement member 60 in the axial direction along the axis of rotation X. In the present embodiment, the inclined surface 64e of the first end portion 64a is not in contact with the engagement member 60.

The inclined surface 64e configured as described above comes into contact with the engagement member 60 in the second position and moves the engagement member 60 until the toggle spring member 62 exceeds the dead point. Here, when the toggle spring member 62 exceeds the dead point, the engagement member 60 returns to the first position due to the biasing force of the toggle spring member 62.

Figure 8B:
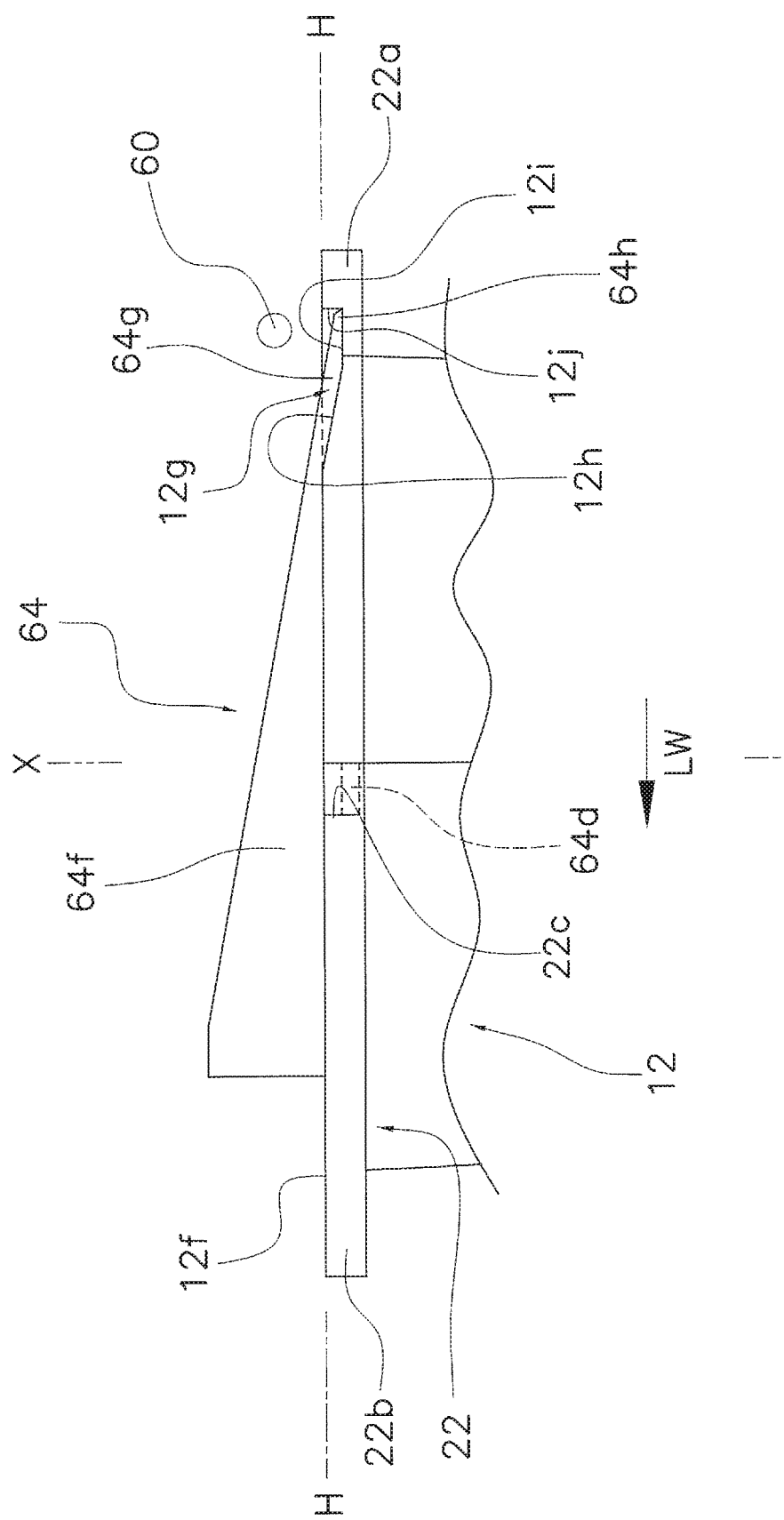
FIG. 8B is a top view of a partially enlarged switching member.

The configuration of the switching member 64 may be expressed as follows. As shown in FIG. 8B, the switching member 64 has a first portion 64f and a second portion 64g.

The first portion 64f is a portion disposed outside of the accommodation recess 12g. More specifically, the first portion 64f is disposed outside of the accommodation recess 12g with respect to the plane H along the supporting surface 12f of the reel body 12. For example, the first portion 64f is formed in an arcuate shape. The first portion 64f is disposed on the supporting surface 12f.

The first portion 64f forms the first end portion 64a, the second end portion 64b, and the intermediate portion 64c, described above. More specifically, the first portion 64f forms the portion of the first end portion 64a outside of the accommodation recess 12g, the second end portion 64b, and the intermediate portion 64c.

The second portion 64g is the portion accommodated in the accommodation recess 12g. The second portion 64g is the portion of the first end portion 64a excluding the first portion 64f described above. The second portion 64g forms a portion of the first end portion 64a described above.

The second portion 64g is disposed in the accommodation recess 12g, with respect to the plane H along the supporting surface 12f of the reel body 12. For example, the second portion 64g is formed integrally with the first portion 64f. The second portion 64g is disposed in the accommodation recess 12g projecting from the first portion 64f in the axial direction along the axis of rotation X with respect to the plane H along the supporting surface 12f of the reel body 12.

The distal end of the second portion 64g corresponds to the distal end 64h of the first end portion 64a described above. That is, the distal end 64h of the second portion 64g is accommodated in the accommodation recess 12g.

The attachment portion 64d described above is disposed on the first portion 64f. The inclined surface 64e described above is disposed on the first portion 64f and the second portion 64g on the opposite side of the supporting surface 12f in the axial direction along the axis of rotation X, that is, on the spool 14 side.

Operation and Movement of the Reel
Operation During Casting

Figure 9:
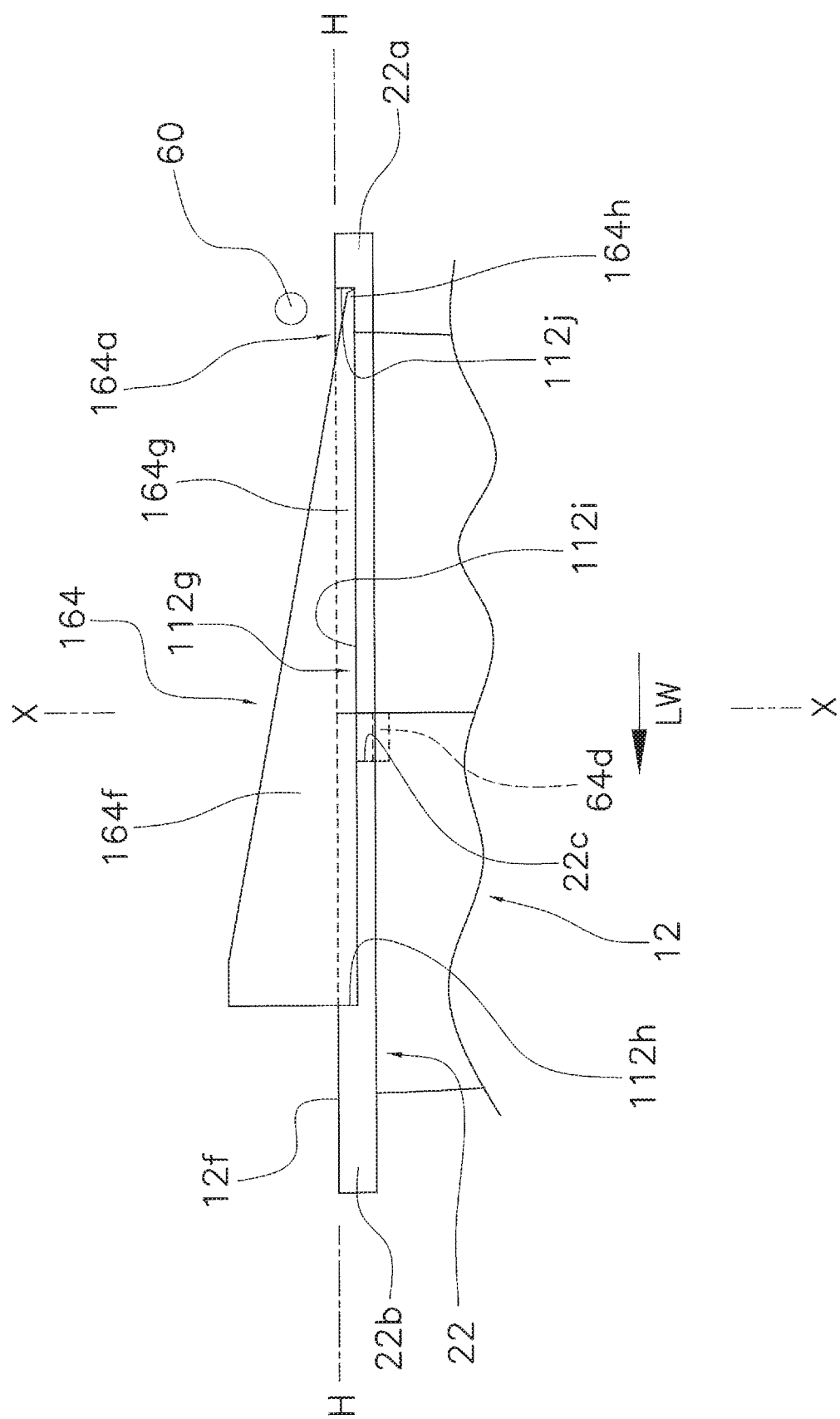
FIG. 9 is a view corresponding to FIGS. 8A and 8B according to another embodiment.

During casting, the anti-reverse rotation mechanism 34 is set in the reverse prohibited state, and, by pivoting the bail arm 18, the bail arm 18 is inverted from the line-winding attitude shown in FIG. 4 to the line-releasing attitude shown in FIG. 9. In this state, it is possible to unreel or cast the fishing line from the spool 14.

Here, when the bail arm 18 is disposed in the line-releasing attitude, the engagement member 60 is disposed in the second position. In addition, the rear-end portion 60c of the engagement member 60 engages the engagement portion 74a of the braking member 74. In this state, when the rotor 16 rotates, the braking member 74 slides on the tubular portion 12e of the reel body 12 and brakes the rotor 16.

In addition, when the bail arm 18 (for example, the first bail support member 42) is inverted from the line-winding attitude to the line-releasing attitude, the rod 68 of the toggle spring member 62 pivots in the counterclockwise direction while compressing the coil spring 70 (refer to FIGS. 4 and 10).

Then, once the toggle spring member 62 exceeds the dead point (refer to FIG. 10), the rod 68, being biased by the coil spring 70, pivots the first bail support member 42 farther to the line-releasing attitude side and holds the first bail support member 42 in the line-releasing attitude. In this manner, the bail arm 18 is reversed from the line-winding attitude to the line-releasing attitude and held in the line-releasing attitude.

Operation after Casting

After casting, when the handle 26 is rotated in the line-winding direction in a state in which the bail arm 18 is disposed in the line-releasing attitude, the rotor 16 rotates in the line-winding direction LW (the direction of the arrows in FIGS. 4 and 6) by the rotor drive mechanism 28. The bail arm 18 then returns to the line-winding attitude from the line-releasing attitude by the bail reversing mechanism 20.

Here, when the rotor 16 rotates in the line-winding direction LW, the bail arm 18 rotates together with the rotor 16. At this time, the engagement member 60 in the second position rotates together with the bail arm 18 (for example, the first bail support member 42).

When the rear-end portion 60c of the engagement member 60 comes into contact with the inclined surface 64e of the switching member 64, the rear-end portion 60c is guided along the inclined surface 64e and the engagement member 60 moves from the second position to the first position. As a result, the bail arm 18, for example, the first bail support member 42, starts changing the attitude from the line-releasing attitude to the line-winding attitude.

Then, when the toggle spring member 62 exceeds the dead point, the rod 68, being biased by the coil spring 70, pivots the first bail support member 42 farther to the line-winding attitude side and holds the first bail support member 42 in the line-winding attitude. In this manner, the bail arm 18 returns to the line-winding attitude from the line-releasing attitude and is held in the line-winding attitude.

In the spinning reel 10 described above, the reel body 12 has the accommodation recess 12g, and a portion of the switching member 64 (one example of the first end portion 64a) is accommodated in the accommodation recess 12g. In this manner, by accommodating the portion of the switching member 64 lacking rigidity, for example, a portion of the first end portion 64a, in the accommodation recess 12g, it is possible to increase the thickness of the first end portion 64a; therefore, it is possible to improve the rigidity of the first end portion 64a. That is, deformation of the switching member 64 can be suitably prevented.

In addition, since the distal end 64h of the switching member 64, for example, the distal end 64h of the first end portion 64a, is accommodated in the accommodation recess 12g, it is possible to prevent contact between the distal end 64h of the first end portion 64a and the engagement member 60. It is thereby possible to prevent deformation of the distal end 64h of the switching member 64 (first end portion 64a).

By configuring the switching member 64 in this manner, the switching member 64 can stably guide the engagement member 60 from the second position to the first position. In other words, it is possible to stably operate the bail reversing mechanism 20.

OTHER EMBODIMENTS

One embodiment of the present invention is described above, but the present invention is not limited to the above-described embodiment, and various modifications can be made without departing from the scope of the invention. In particular, the various embodiments and modified examples described herein can be arbitrarily combined as required.

In the present embodiment, an example was presented in which a portion of the switching member 64, for example, a portion of the first end portion 64a (second portion 64g) is accommodated in the accommodation recess 12g.

Alternatively, as shown in FIG. 9, a switching member 164, for example, a bottom portion of the switching member 164 (second portion 164g) may be housed in the accommodation recess 112g. In FIG. 9, configurations that are the same as those in the embodiment described above have been assigned the same reference numerals as in the embodiment.

In this embodiment, side surfaces 112h, 112j of the accommodation recess 112g on the downstream side and the upstream side in the line-winding direction LW extend from the bottom portion 112i of the accommodation recess 112g toward the axial direction along the axis of rotation X.

A first end portion 164a, a second end portion 164b, and an intermediate portion 164c are accommodated in the accommodation recess 112g. More specifically, the bottom portion of the switching member 164 (second portion 164g) is disposed in the accommodation recess 112g. The distal end 164h of the switching member 164, for example, a distal end 164h of the first end portion 164a is accommodated in the accommodation recess 112g.

The portion (164f) of the first end portion 164a, the second end portion 164b, and the intermediate portion 164c, excluding the bottom portion (second portion 164g) of the switching member 164, is disposed outside of the accommodation recess 112g with respect to the plane H along the supporting surface 12f of the reel body 12.

Even with such a configuration, it is possible to improve the rigidity of the first end portion 164a. That is, deformation of the switching member 164 can be suitably prevented.

In the embodiment described above, the rotor 16 is rotatable in the line-winding direction and the line-releasing (casting) direction, but the rotor 16 may be configured to be rotatable only in the line-winding direction. In this embodiment, the anti-reverse rotation mechanism 34 always prohibits the rotation of the rotor 16 in the line-releasing direction.

In the embodiment described above, an explanation was given using a front drag spinning reel 10 as an example, but the present invention may be applied to other spinning reels as long as the spinning reel has a bail reversing mechanism 20. For example, the present invention can be applied to all spinning reels including a rear drag type spinning reel and a lever brake type spinning reel that can brake the rotor with a lever member.

What is claimed is:

1. A spinning reel configured to be capable of switching an attitude of a bail arm from a line-releasing attitude to a line-winding attitude when a rotor rotates in a line-winding direction, comprising:
   a reel body; and
   a bail reversing mechanism comprising an engagement member engaging the bail arm and a switching member disposed on the reel body, the hail reversing mechanism configured to reverse the attitude of the bail arm via the engagement member by contact with the engagement member,
   the reel body including an accommodation recess for accommodating at least a portion of the switching member, and
   the switching member including an inclined surface, and a portion of the inclined surface being disposed within the accommodation recess.

2. The spinning reel according to claim 1, wherein
   the switching member has
   a first end portion,
   a second end portion, at least a portion of the second portion being thicker than the first end portion in an axial direction along an axis of rotation of the rotor, and
   an intermediate portion, disposed between the first end portion and the second end portion, and configured to guide the engagement member in the axial direction by coming into contact with the engagement member, and
   at least a portion of the first end portion is accommodated in the accommodation recess.

3. The spinning reel according to claim 2, wherein
   the switching member includes an attachment portion disposed on at least one of the first end portion, the second end portion, or the intermediate portion.

4. A spinning reel configured to be capable of switching an attitude of a bail arm from a line-releasing attitude to a line-winding attitude when a rotor rotates in a line-winding direction, comprising: a reel body; and
   a bail reversing mechanism comprising an engagement member engaging the bail am and a switching member disposed on the reel body, the bail reversing mechanism configured to reverse the attitude of the bail arm via the engagement member by contact with the engagement member,
   the reel body including an accommodation recess for accommodating, at least a portion of the switching member,
the switching member has
   a first end portion, a second end portion, at least a portion of the second portion being thicker than the first end portion in an axial direction along an axis of rotation of the rotor, and an intermediate portion, disposed between the first end portion and the second end portion, and configured to guide the engagement member in the axial direction by coming into contact with the engagement member, and at least a distal end of the first end portion is accommodated in the accommodation recess.

5. A spinning reel configured to be capable of casting a fishing line in a forward direction, comprising:

a reel body;

a spool disposed in the reel body, and around which the fishing line is capable of being wound;

a rotor configured to be rotatable relative to the reel body so as to wind the fishing line around the spool;

a bail arm pivotably disposed on the rotor so as to be capable of changing attitude between a line-winding attitude, in which the fishing line is capable of being wound around the spool, and a line-releasing attitude, in which the fishing line is capable of being released from the spool;

an engagement member disposed on the rotor so as to be movable between a first position corresponding to the line-winding attitude and a second position corresponding to the line-releasing attitude, in conjunction with the pivoting of the bail arm, and configured to engage the bail arm; and a switching member configured to switch the attitude of the bail arm by moving the engagement member from the second position to the first position when the engagement member is positioned at the second position and the rotor rotates in the line-winding direction, the reel body having has an accommodation recess for accommodating at least a portion of the switching member, and the switching member including an inclined surface, and a portion of the inclined surface being disposed within the accommodation recess.

* * * * *